United States Patent [19]
Martin et al.

[11] Patent Number: 5,601,170
[45] Date of Patent: Feb. 11, 1997

[54] FLUID FRICTION COUPLING

[75] Inventors: Hans Martin; Harald Dax, both of Stuttgart, Germany

[73] Assignee: Behr GmbH & Co., Stuttgart, Germany

[21] Appl. No.: 334,311

[22] Filed: Nov. 2, 1994

[30] Foreign Application Priority Data

Nov. 9, 1993 [DE] Germany .................... 43 38 163.4

[51] Int. Cl.⁶ ................................................. F16D 35/00
[52] U.S. Cl. ................... 192/58.681; 192/82 T; 192/112; 192/113.21; 192/113.24; 29/511
[58] Field of Search ............... 192/58 B, 82 T, 192/58.5, 58.61, 58.63, 58.6, 58.681, 58.4, 113.24, 113.21, 112; 29/509, 511, 510

[56] References Cited

U.S. PATENT DOCUMENTS

| | | | |
|---|---|---|---|
| 1,804,284 | 5/1931 | Smith | 29/511 |
| 1,851,938 | 3/1932 | Rieke | 29/511 |
| 2,170,386 | 8/1939 | Merole | 29/511 |
| 3,323,623 | 6/1967 | Roper . | |
| 3,536,175 | 10/1970 | Kawabe et al. . | |
| 4,056,876 | 11/1977 | Lämmermann | 29/511 X |
| 4,134,484 | 1/1979 | Lansinger . | |
| 4,378,865 | 4/1983 | McLean | 188/379 |
| 4,527,675 | 7/1985 | Omata et al. . | |
| 4,570,771 | 2/1986 | Yamaguchi et al. . | |
| 4,653,624 | 3/1987 | Mader . | |
| 4,850,465 | 7/1989 | Ono . | |
| 4,960,191 | 10/1990 | Lambert et al. . | |
| 4,987,986 | 1/1991 | Kennedy et al. . | |
| 5,060,774 | 10/1991 | Takikawa et al. . | |
| 5,384,948 | 1/1995 | Bonfilio | 29/520 |

FOREIGN PATENT DOCUMENTS 3733815  10/1987  Germany ...................... 192/58

*Primary Examiner*—Charles A. Marmor
*Assistant Examiner*—Saul Rodriguez
*Attorney, Agent, or Firm*—Walter Ottesen

[57] ABSTRACT

A fluid friction coupling includes a housing defining a work chamber and rotatably journalled on a drive shaft. The housing contains a viscous medium and a drive disc for transmitting torque to said housing via fluid friction in the viscous medium. The housing has an inner housing part having a first peripheral edge and an outer housing part having a second peripheral edge. The peripheral edges conjointly define a form-tight interlocked interface. A plurality of raised portions and a plurality of recesses between the raised portions are provided on one of the peripheral edges. The other peripheral edge is a flange having a periphery and the flange has a plurality of outermost edge regions along the periphery. The outermost edge regions on the one hand and the raised portions and the recesses on the other hand are joined together to conjointly define the form-tight interlocked interface.

10 Claims, 4 Drawing Sheets

FLUID FRICTION COUPLING

BACKGROUND OF THE INVENTION

A fluid friction coupling is disclosed, for example, in U.S. Pat. No. 4,960,191 wherein the housing is configured as two parts. The so-called base body is supported on the drive shaft and is connected to the cover of the coupling by means of a jointed-flange connection, that is, the material of the base body is pressed over the outermost edge region of the cover so that a ring-shaped retaining lip is formed. This jointed-flange connection also acts to prevent rotation of the cover and base body relative to each other.

A similar jointed-flange connection between cover and base body is disclosed in U.S. Pat. No. 5,060,774.

Finally, a fluid friction coupling is disclosed in U.S. Pat. No. 4,570,771 wherein the base body and cover are safeguarded against rotation in a form tight and friction tight manner by means of a threaded-fastener connection.

The disadvantage of these known jointed-flange connections is that the frictional lock between cover and base body is no longer adequate at specific magnitudes of torque so that an unwanted relative movement between base body and cover occurs. On the other hand, safeguarding against rotation utilizing threaded fasteners is complex, first because of the needed space for construction and second, because of increased costs.

SUMMARY OF THE INVENTION

It is an object of the invention to provide a fluid friction coupling wherein the above-mentioned disadvantages are avoided and wherein a safeguard against rotation between base body and cover of a coupling housing of the kind referred to above is simple and cost effective.

The fluid friction coupling of the invention includes a drive shaft; a housing defining a work chamber and being rotatably journalled on the drive shaft; a drive disc mounted on the drive shaft so as to be rotatable in the work chamber; the housing containing a viscous medium and the drive disc and the housing conjointly defining means for transmitting torque from the drive disc to the housing via fluid friction in the viscous medium; the housing having an inner housing part having a first peripheral edge and an outer housing part having a second peripheral edge; the peripheral edges conjointly defining a form-tight interlocked interface; one of the edges having a plurality of raised portions and a plurality of recesses between the raised portions; the other one of the edges being a flange having a periphery and the flange having a plurality of outermost edge regions along the periphery; and, the outermost edge regions on the one hand and the raised portions and the recesses on the other hand being joined together to conjointly define the form-tight interlocked interface.

The raised portions and/or recesses on the inner housing part and pressing in the flanged edge produce a form tight interlock which permits large torques to be transmitted. These constructional measures on the housing part are very simple to produce and the assembly operation remains as it was; that is, rolling takes place in the same manner and a form-tight interlock is provided because the material is squeezed into the intermediate spaces.

The peaks or raised portions can be configured as radially extending ribs which, if required, can define an extension of the cooling ribs already present but with reduced elevation (h). The meshing of the flanged edge and the ribs or the intermediate spaces between the ribs can be configured in the nature of a serration. The ribs do not have to be machined in a manner where chips are produced in order to produce the desired safeguard against rotation; instead, the ribs can be produced in an injection or pressure mold in the manner of the known cooling ribs so that the surface is in the form of a casting skin. This manufacturing method means significant cost advantages compared to metal working wherein chips are produced. Therefore, no additional work step is required because flanging or rolling can be applied in advance. Finally, a pasty seal in a corresponding recess is provided when the rolling operation is performed with the recess then being closed by the flanged edge.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
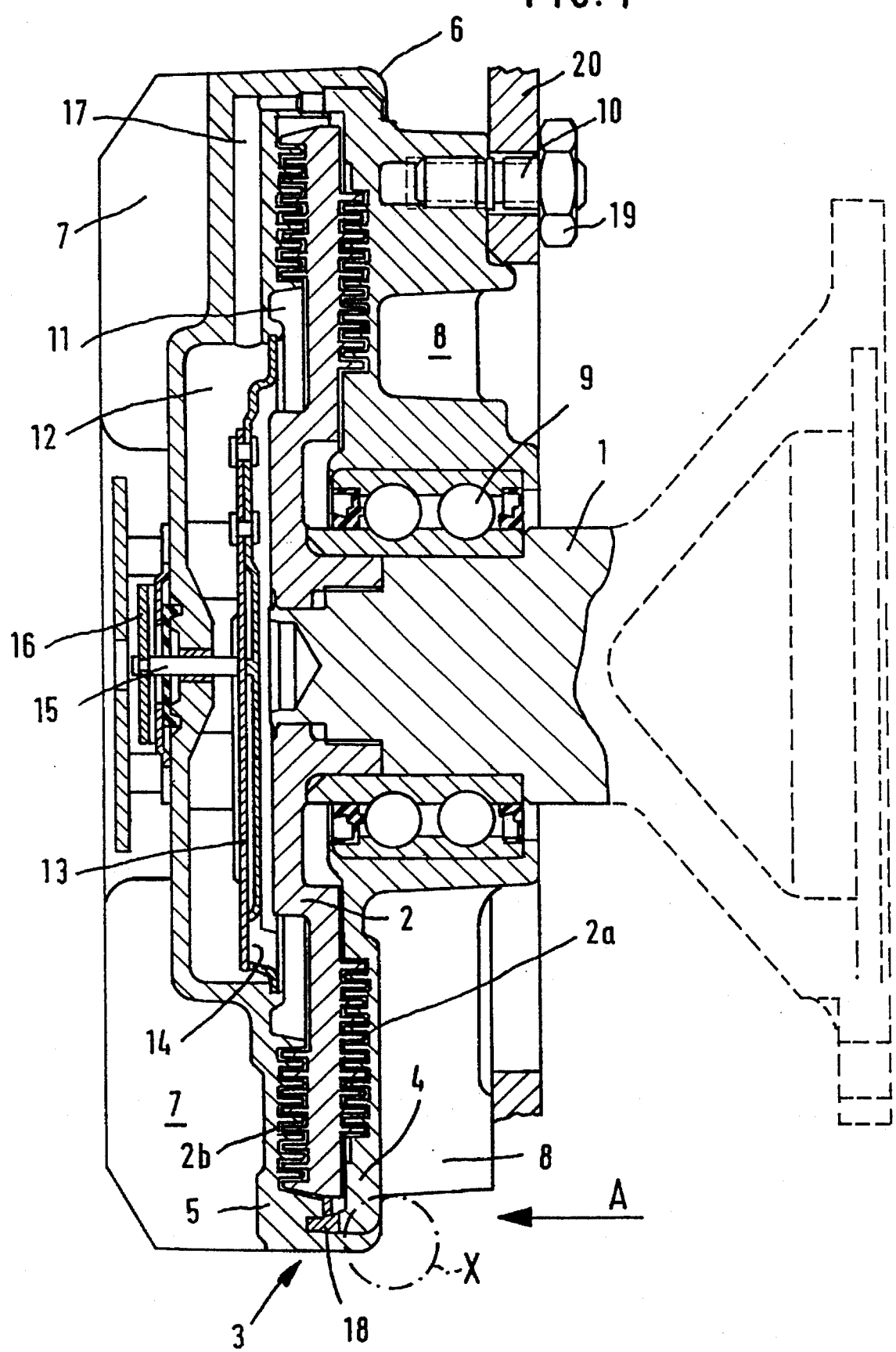
FIG. 1 is an elevation view, in section, of a fluid friction coupling according to the invention.

Referring to FIG. 1, the fluid friction coupling comprises a drive shaft 1 and a drive disc 2 supported at one end thereof. The drive disc 2 has two work surfaces 2a and 2b and rotates in a work chamber 11 of the housing. The housing has two parts: an inner housing part, namely the base body 4, and an outer housing part which is here the cover 5. The base body 4 is journalled by means of a roller bearing 9 on the drive shaft 1 and supports a fan 20 (shown only in part) which cools an internal combustion engine of a motor vehicle. The fan 20 is connected to the base body 4 by means of bolts 10 and nuts 19 so that it cannot rotate relative to the base body. The base body 4 and cover 5 have respective sets of radially extending cooling ribs 7 and 8 at their end faces. The base body 4 and cover 5 are connected to each other by a flange connection 6.

The torque transmission from the drive shaft 1 to the coupling housing 3 takes place via liquid friction in a manner known per se. For this reason, the work chamber 11 is filled with a viscous medium (Silicone oil) which circulates between the work chamber 11 and a supply chamber 12 via a valve opening 14 and a return bore 17 in a manner known per se. The output rpm of the coupling is controlled by an externally mounted bimetal 16 which actuates a valve lever 13 via a switching pin 15. The valve lever 13 controls the valve opening 14. Finally, a dam 18 is provided which facilitates the return of the silicone oil from the work chamber 11 to the supply chamber 12.

Figure 2:
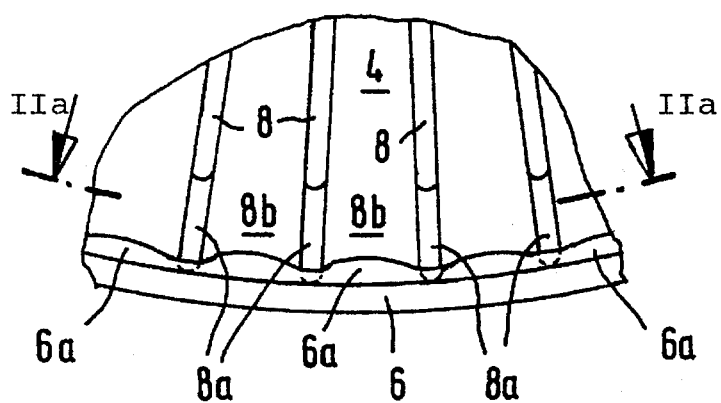
FIG. 2 is a detail view seen in direction A of FIG. 1.

A detail view in the direction A shown in FIG. 1 is provided in FIG. 2. This view shows the rear side of the coupling, namely, a portion of the end face of the base body 4 with the ribs 8 which extend in the radial direction. The ribs 8 are extended outwardly with axially reduced rib portions 8a thereof. Intermediate spaces 8b are provided between each two mutually adjacent ones of the ribs 8a. The outermost peripheral region of the cover 5 defines the flanged edge 6 which is pressed or rolled over the outermost tips of the rib portions 8a.

Figure 2A:
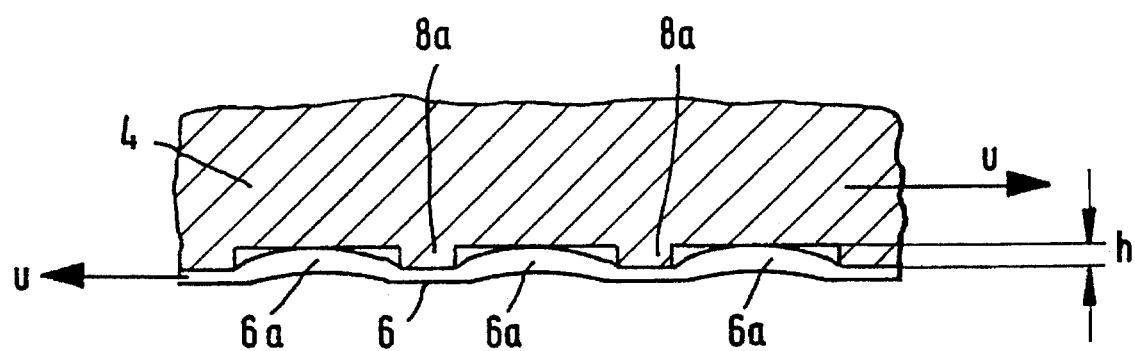
FIG. 2a is a detail view along the surface IIa—IIa of FIG. 2.

A section taken along line IIa—IIa of FIG. 2 is shown in FIG. 2a somewhat enlarged. In FIG. 2a, the base body 4 is shown hatched, that is in section, with the ribs 8a shown projecting from the end face of the base body 4. The ribs 8a are shown having a height (h). An approximately U-shaped intermediate space 8b lies between each two mutually adjacent ones of the ribs 8a. The outermost flanged edge 6 is pressed into these intermediate spaces 8b so that wave-shaped depressions 6a result.

FIG. 2a shows two arrows marked U which indicate the directions of the peripheral forces acting on parts 4 and 5. A type of intermeshing is obtained with this form-tight interlocking between ribs 8a and wave-shaped portions 6a of the flanged edge 6 which can transmit considerable torques. This is especially important when the drive disc 2 transmits a torque to the coupling housing 3 on both sides 2a and 2b. In this case, it is necessary that the torque transmission from one housing part to the other housing part, which supports the fan, is ensured.

Figure 3A:
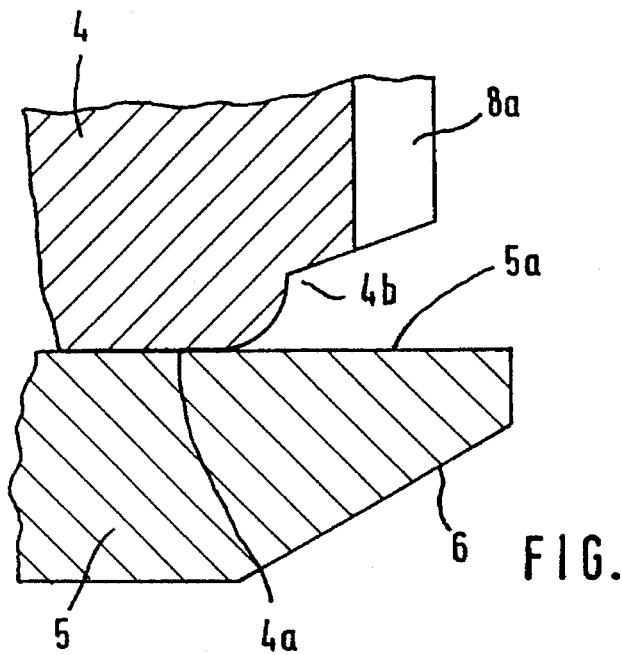
FIG. 3a is a detail view of the portion of the housing of the coupling within the circle X of FIG. 1 in advance of the rolling operation.
Figure 3B:
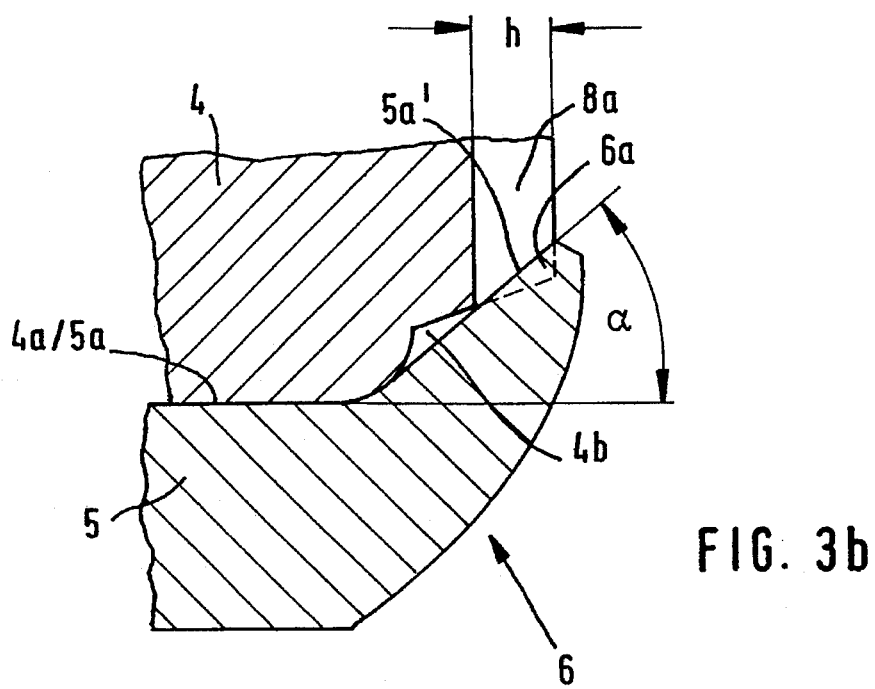
FIG. 3b is the same detail X of FIG. 3a after the rolling operation.

The already-mentioned detail X of FIG. 1 is shown in FIGS. 3a and 3b. FIG. 3a shows the condition of the base body 4 and the cover 5 in advance of rolling. Both housing parts are inserted one into the other via a fit (4a, 5a). Before rolling, the flanged edge 6 has the shape of a hollow cylinder 5a inside and a conical shape outside. The radially extending outer rib portions 8a are on the and face of the base body 4 and are distributed about the periphery of this end face.

FIG. 3b shows both parts 4 and 5 after the rolling operation; that is, the flanged edge 6 is inclined with its inner surface 5a' at an angle α of approximately 45° with respect to the fit (4a, 5a) and forms an overlap 6a in the peripheral direction with the rib portions 8a, that is, a form-tight interlock. The form-tight interlock is formed by the wave-shaped portions 6a mentioned above which are pressed into the intermediate spaces 8b. Furthermore, a peripherally-extending step 4b is provided on the base body 4 which is filled with a pasty seal and, after the rolling operation, is closed by the flanged edge 6.

Figure 4:
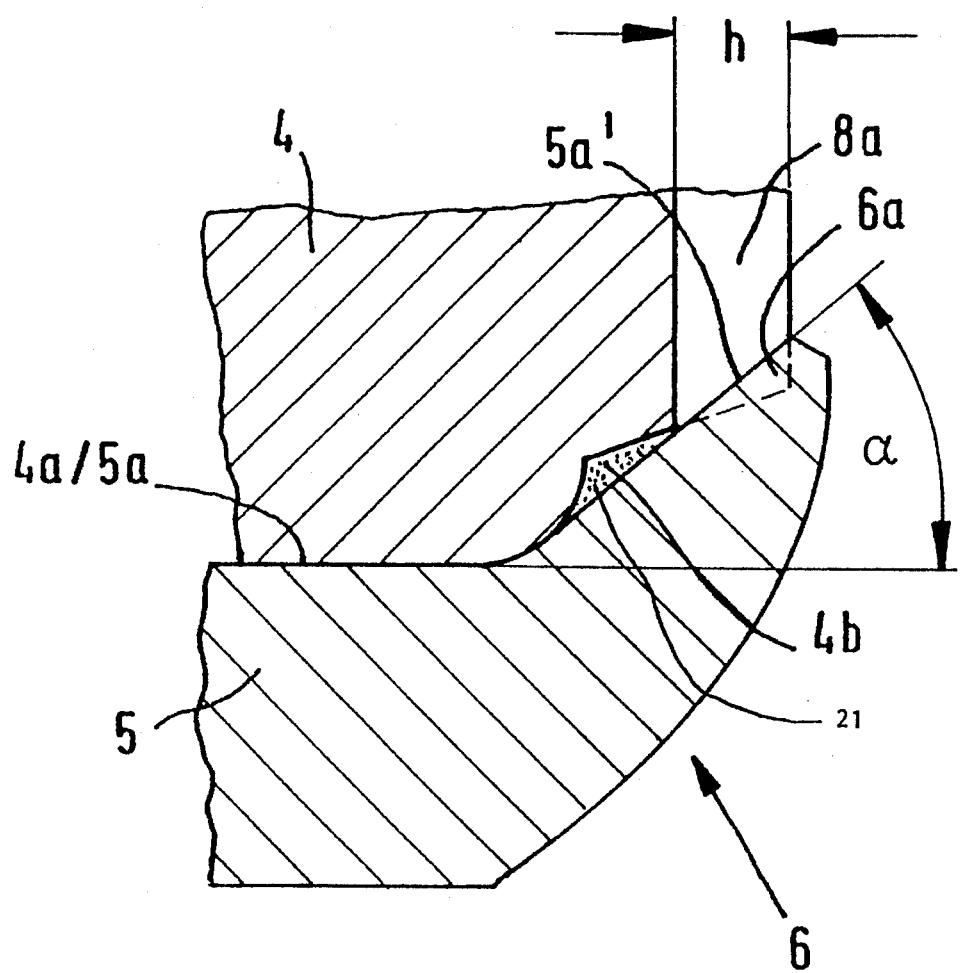
FIG. 4 is a detail view corresponding to that of FIG. 3b but further enlarged to show an annular seal in a recess closed by the bent-over flanged edge.

The step 4b and the inner surface 5a' conjointly define an annular cavity filled with pasty seal 21 as shown in FIG. 4. The pasty seal can, for example, be a sealing material available in the marketplace under the trademark LOCKTIGHT.

It is here evident that no additional operating step with respect to the known rolling operation is required because the rolling or clinching takes place in the same manner as earlier with the difference that the inner surface of the flanged edge is now beveled in between the individual rib portions 8a thereby producing the desired interlock. The ribs 8a need only a slight height (h) of approximately 1 to 3 mm.

The flanged edge 6 can be provided as well on the cover as shown above as on the base body. The corresponding rib portions 8a would then be on the cover.

Furthermore, the ribs 8a do not always have to have a radial extension of the cooling ribs 8, for example, when such cooling ribs are not provided oh the housing. In this case, any desired arrangement of raised portions distributed on the periphery such as protrusions and/or recesses in the region of the flanged edge would be adequate.

It is understood that the foregoing description is that of the preferred embodiments of the invention and that various changes and modifications may be made thereto without departing from the spirit and scope of the invention as defined in the appended claims.

What is claimed is:

1. A fluid friction coupling comprising:

a drive shaft;

a housing defining a work chamber and being rotatably journalled on said drive shaft;

a drive disc mounted on said drive shaft so as to be rotatable in said work chamber;

said housing containing a viscous medium and said drive disc and said housing conjointly defining means for transmitting torque from said drive disc to said housing via fluid friction in said viscous medium;

said housing having an inner housing part having a first peripheral edge and an outer housing part having a second peripheral edge;

said peripheral edges conjointly defining a form-tight interlocked interface;

one of said housing parts having a plurality of cooling ribs formed thereon to define a plurality of cooling rib extensions reaching to said peripheral edge of said one housing part;

said cooling rib extensions being raised portions defining a plurality of recesses between said cooling rib extensions;

the other one of said edges being a flange having a periphery and said flange having a plurality of outermost edge regions along said periphery; and, said outermost edge regions on the one hand and said cooling rib extensions and said recesses on the other hand being joined together to conjointly form a toothlike interengagement defining said form-tight interlocked interface.

2. The fluid friction coupling of claim 1, wherein said first peripheral edge is said one peripheral edge having said plurality of cooling rib extensions and said plurality of recesses formed thereon and said second peripheral edge is said other one of said peripheral edges.

3. The fluid friction coupling of claim 1, said fluid friction coupling defining an axis of rotation; said flange being a bent-over flange having an approximately conical inner surface; and, said inner surface and said axis conjointly defining an angle α in the range of approximately 30° to 60°.

4. The fluid friction coupling of claim 1, said cooling ribs being cast cooling ribs formed in a mold and being unmachined.

5. The fluid friction coupling of claim 1, said cooling ribs having a height (h) at said interlocked interface in the range 1 mm to 3 mm.

6. The fluid friction coupling of claim 1, said inner and outer housing parts conjointly defining a press fit whereat said outer housing part is seated on said inner housing part; said inner housing part having a peripherally extending step formed thereon directly beneath said flange; said step and said flange conjointly defining an enclosed annular space; and, said fluid friction coupling further including pasty sealing means filling out said annular space whereby providing a seal for said housing.

7. A fluid friction coupling comprising:

a drive shaft defining an axis of rotation;

a housing defining a work chamber and being rotatably journalled on said drive shaft;

a drive disc mounted on said drive shaft so as to be rotatable in said work chamber;

said housing containing a viscous medium and said drive disc and said housing conjointly defining means for transmitting torque from said drive disc to said housing via fluid friction in said viscous medium;

said housing having an inner housing part having a first peripheral edge in a plane transverse to said axis and an outer housing part having a second peripheral edge;

said peripheral edges being subjected to mutually opposing peripheral reaction forces acting in said plane when torque is transmitted between said housing parts and said peripheral edges conjointly defining a form-tight interlocked interface;

one of said housing parts having a plurality of cooling ribs formed thereon to define a plurality of cooling rib extensions reaching to said peripheral edge of said one housing part;

said cooling rib extensions being raised portions defining a plurality of recesses between said cooling rib extensions;

the other one of said edges being a flange having a periphery and said flange having a plurality of outermost edge regions disposed along said periphery opposite corresponding ones of said recesses; and, said outermost edge regions on the one hand and said cooling rib extensions and said recesses on the other hand being intermeshingly joined so that said outermost edge regions are disposed in said recesses, respectively, to define said form-tight interlocked interface thereby facilitating the transmission of said torque between said housing parts.

8. The fluid friction coupling of claim 7, said cooling rib extensions having radially extending cornered edges transverse to said peripheral reactive forces; and, said cooling rib extensions and said flange with said outermost edge regions being joined to coact to form an end face tooth-like interengagement which defines said form-tight interlocked interface.

9. The fluid friction coupling of claim 8, said cooling rib extensions having a height (h) at said interlocked interface in the range of 1 mm to 3 mm.

10. The fluid friction coupling of claim 7, said inner and outer housing parts conjointly defining a press fit whereat said outer housing part is seated on said inner housing part; said inner housing part having a peripherally extending step formed thereon directly beneath said flange; said step and said flange conjointly defining a completely enclosed annular space; and, said fluid friction coupling further including pasty sealing means filling out and being trapped in said annular space thereby providing a seal for said housing.

* * * * *

UNITED STATES PATENT AND TRADEMARK OFFICE
CERTIFICATE OF CORRECTION

PATENT NO. : 5,601,170

DATED : February 11, 1997

INVENTOR(S) : Hans Martin and Harald Dax

It is certified that error appears in the above-identified patent and that said Letters Patent is hereby corrected as shown below:

In column 3, line 33: delete "and" and substitute -- end -- therefor.

In column 3, line 49: delete "LOCKTIGHT" and substitute -- SILASTIK -- therefor.

In column 4, line 53: between "range" and "1", please insert -- of --.

In column 4, line 62: delete "whereby" and substitute -- thereby -- therefor.

Signed and Sealed this

Twentieth Day of May, 1997

*Attest:*

BRUCE LEHMAN

*Attesting Officer*   *Commissioner of Patents and Trademarks*